United States Patent [19]
Tanaka

[11] 3,956,686
[45] May 11, 1976

[54] COMPENSATING CIRCUIT FOR A COLD JUNCTION OF A THERMOCOUPLE

[75] Inventor: Katsuaki Tanaka, Tokyo, Japan

[73] Assignee: Iwatsu Electric Co., Ltd., Tokyo, Japan

[22] Filed: Sept. 20, 1974

[21] Appl. No.: 507,855

[30] Foreign Application Priority Data
Sept. 29, 1973 Japan .......................... 48-110034

[52] U.S. Cl. ............................. 322/2 R; 73/361; 324/105
[51] Int. Cl.² .................... G01K 5/72; G01K 7/12
[58] Field of Search ............... 322/2; 73/1 F, 360, 73/361, 359; 324/74, 105, 106, 115; 323/75 H

[56] References Cited
UNITED STATES PATENTS

| | | |
|---|---|---|
| 3,582,761 | 6/1971 | Hall, Jr. .......................... 322/2 R |
| 3,650,154 | 3/1972 | Arnett et al. ........................ 73/361 |
| 3,754,442 | 8/1973 | Arnett ............................. 323/75 H |
| 3,793,630 | 2/1974 | Meijer ........................... 73/359 UX |

Primary Examiner—R. N. Envall, Jr.
Assistant Examiner—Robert J. Hickey
Attorney, Agent, or Firm—Woodcock, Washburn, Kurtz & Mackiewicz

[57] ABSTRACT

A compensating circuit for a cold junction of a thermocouple includes a sign inverting amplifier, a power source and a summing amplifier. A thermoelectromotive force of the thermocouple, the output of the sign inverting amplifier and the voltage of the power source are applied to one input terminal of the summing amplifier through resistors. An output corresponding to the temperature of the hot junction of the thermocouple is obtained from the output terminal of the summing amplifier.

5 Claims, 1 Drawing Figure

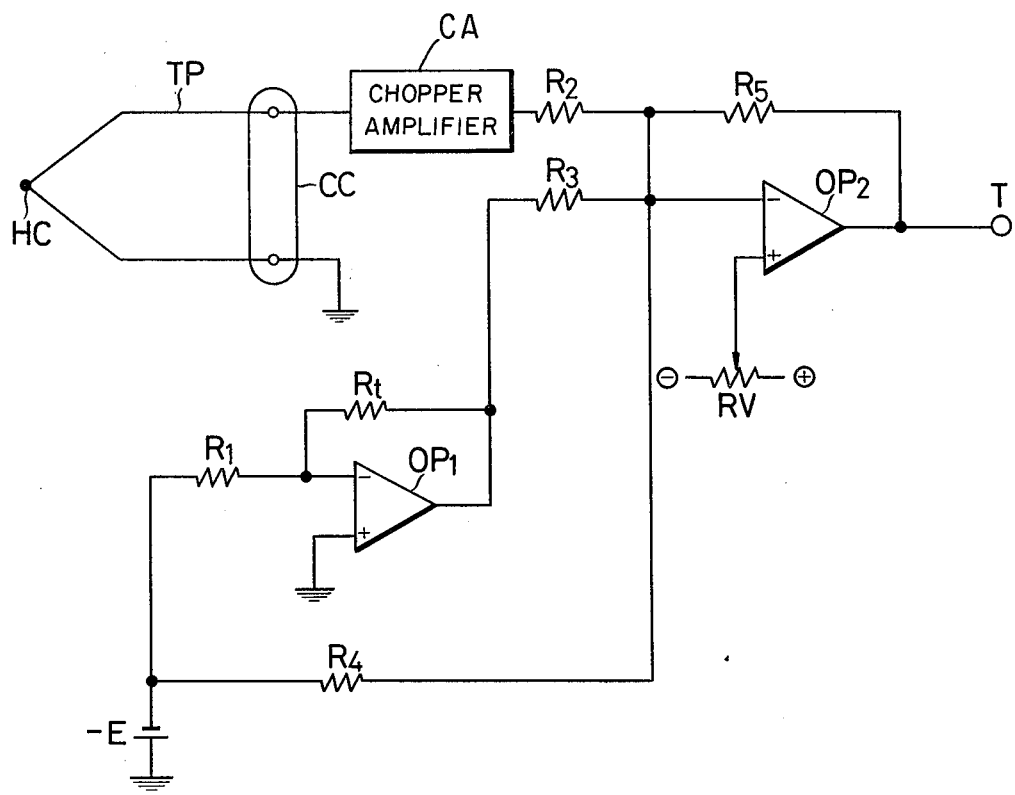

COMPENSATING CIRCUIT FOR A COLD JUNCTION OF A THERMOCOUPLE

BACKGROUND OF THE INVENTION

1. Field of the Invention

This invention relates to a compensating circuit for a cold junction of a thermocouple as a thermo-electro transducer and more particularly to a compensating circuit for a cold junction of a thermocouple which is stable in the wide range of the temperature.

2. Description of the Prior Art

In the conventional method for the compensation of the cold junction of the thermocouple, the cold junction is dipped into iced water at 0°C. The conventional method is highly accurate, but it has the disadvantage that it is not simple. An electrical method has been proposed for the compensation of the cold junction. However, its operation is unstable and not very accurate. For example, there is a Wheatstone bridge connected to the cold junction of the thermocouple. A copper resistor is connected in one line of the bridge. However, it is difficult to balance perfectly the bridge in the wide range of the temperature.

SUMMARY OF THE INVENTION

An object of this invention is to provide a compensating circuit for a cold junction of a thermocouple which can compensate electrically a cold junction.

Another object of this invention is to provide a compensating circuit for a cold junction of a thermocouple which can compensate simply and accurately the cold junction.

A further object of this invention is to provide a compensating circuit for a cold junction of a thermocouple which can operate stably in a wide range of the temperature.

A still further object of this invention is to provide a compensating circuit for a cold junction of a thermocouple in which a thermoelectromotive force of a thermocouple can be amplified.

The above, and other objects, features and advantages of the invention, will be apparent in the following detailed description of illustrative embodiments thereof which is to be read in connection with the accompanying drawings.

BRIEF DESCRIPTION OF THE DRAWING

The FIGURE is a diagrammatic representation of a compensating circuit for a cold junction of a thermocouple according to one embodiment of this invention.

DESCRIPTION OF THE PREFERRED EMBODIMENTS

One embodiment of a compensating circuit for a cold junction of a thermocouple will be described with the drawing.

Referring to the drawing, TP represents a thermocouple, HC a hot junction and CC a cold junction. A resistor $R_1$ and a power source $-E$ are connected between a minus input terminal of a first operational amplifier $OP_1$ and the ground. A copper resistor $R_t$ is arranged in a feedback line of the first operational amplifier $OP_1$. The copper resistor $R_t$ detects the temperature of the cold junction CC of the thermocouple TP. A plus input terminal of the first operational amplifier $OP_1$ is connected to the ground. Thus, the first operational amplifier $OP_1$ is used as a sign-inverting DC amplifier. A minus input terminal of a second operational amplifier $OP_2$ is connected to the thermocouple TP through a resistor $R_2$, to the output terminal of the first operational amplifier $OP_1$ through a resistor $R_3$, and to the power source $-E$ through a resistor $R_4$. A resistor $R_5$ is arranged in a feedback line of the second operational amplifier $OP_2$. Thus, the second operational amplifier $OP_2$ forms a summing amplifier together with the resistors $R_2$, $R_3$, $R_4$ and $R_5$. A potentiometer RV is connected to a plus input terminal of the second operational amplifier $OP_2$. T represents an output terminal of the second operational amplifier $OP_2$.

Next, operations of the compensating circuit for the cold junction of the thermocouple will be described.

If $V_{of}$ is a conversion offset input voltage of the first operational amplifier $OP_1$, the output voltage $V_1$ of the first operational amplifier $OP_1$ is represented by $$V_1 = R_t/R_1 \, E + (1 + R_t/R_1) V_{of} \qquad (1)$$

If thermoelectromotive forces $E_h$ and $E_c$ are generated at the hot junction HC and at the cold junction CC, respectively, a thermoelectromotive force $E_h - E_c$ is obtained from the thermocouple TP. Since the summing amplifier is formed by the resistors $R_2 - R_5$ and the second operational amplifier $OP_2$, an output voltage $V_{out}$ at the output terminal T is represented by $$V_{out} = -\frac{R_5}{R_3} V_1 + \frac{R_5}{R_4} E - \frac{R_5}{R_2}(E_h - E_c)$$
$$+ (1 + \frac{R_5}{R_2} + \frac{R_5}{R_3} + \frac{R_5}{R_4})(V_2 + V_{of2}) \qquad (2),$$

where $V_{of}$ represents a conversion offset input voltage of the second operational amplifier $OP_2$ and $V_2$ a voltage applied to the plus input terminal of the second operational amplifier $OP_2$. The resistance of the copper resistor $R_t$ is represented by $$R_t = R_{to} (1 + \alpha t) \qquad (3),$$

where $t$ represents the temperature of the copper resistor $R_t$, $R_{to}$ the resistance of the copper resistor $R_t$ at 0°C and $\alpha$ the temperature coefficient of the copper resistor $R_t$. The copper resistor $R_t$ and the cold junction CC of the thermocouple TP are arranged in such a manner that the temperature of the cold junction CC of the thermocouple TP is equal to that of the copper resistor $R_t$.

From the equations (1), (2) and (3), the output voltage $V_{out}$ at the output terminal T is represented by $$V_{out} = -\frac{R_5}{R_2} \cdot E_h + \frac{R_5}{R_2} E_c - \frac{R_5}{R_3} \cdot \frac{R_{to}}{R_1} \alpha (E + V_{of1})t$$
$$+ (\frac{R_5}{R_4} - \frac{R_5}{R_3} \cdot \frac{R_{to}}{R_1}) E - \frac{R_5}{R_3}(1 + \frac{R_{to}}{R_1}) V_{of1}$$
$$+ (1 + \frac{R_5}{R_2} + \frac{R_5}{R_3} + \frac{R_5}{R_4})(V_2 + V_{of2}) \qquad (4)$$

If the following relationship holds good in a permissible temperature range for the cold junction CC of the thermocouple TP;

$$E_c = \beta_t \qquad (5),$$

the second term of the equation (4) amounts to zero without dependence on the temperature of the cold junction CC when the resistor $R_1$, $R_2$ or $R_3$, or the voltage of the power source E is determined so as to fulfill the following relationship.

$$\frac{\beta}{R_2} = \frac{1}{R_3} \cdot \frac{R_{t0}}{R_1} \alpha(E + V_{o\!f\!1}) \qquad (6),$$

where $\beta$ is a constant proper to the thermocouple.

Also the third term of the equation (4) amounts to zero without dependence on the temperature of the cold junction CC in such a manner that the input voltage $V_2$ is adjusted by the potentiometer RV so as to put the output voltage $V_{out}$ into zero volt at the temperature 0°C of the hot junction HC. Thus, the equation (4) is converted into $$V_{out} = -\frac{R_5}{R_2} E_h \qquad (7)$$

It is preferable to use the resistors $R_1 - R_5$ the potentiometer RV and the power source $-E$ stable against the temperature.

A platinum resistor may be used instead of the copper resistor. The first operational amplifier can be of an inexpensive normal type. The thermoelectromotive force $E_h$ generated at the hot junction HC is very small. Therefore, it should be generally amplified several hundred times. When a chopper amplifier CA is connected between the resistor $R_2$ and the cold junction CC, or to the output terminal T, at $R_5/R_2 \approx 1$ in the equation (7), the second operational amplifier can be inexpensive. According to this invention, the thermoelectromotive force $E_h$ can be amplified several hundred times by the resistors $R_2$ and $R_5$, and the second operational amplifier $OP_2$, where the second operational amplifier $OP_2$ should have less thermal drift.

Although an illustrative embodiment of the invention has been described in detail herein with reference to the accompanying drawing, it is to be understood that the invention is not limited to this precise embodiment, and that various changes and modifications may be effected therein without departing from the scope or spirit of the invention as defined in the appended claims.

What is claimed is:

1. A compensating circuit for a cold junction of a thermocouple, comprising a power source, a sign inverting DC amplifier having one input thereof connected to said power source, a heat-sensing resistor connected in a feedback path of said sign inverting amplifier and a summing amplifier having an input connected to the output of said sign inverting DC amplifier, a thermoelectromotive force generated from a thermocouple and the voltage of said power source are applied to said input of said summing amplifier through resistors, respectively, whereby an output corresponding to the temperature of the hot junction of said thermocouple is obtained from an output terminal of said summing amplifier.

2. A compensating circuit for a cold junction of a thermocouple according to claim 1, wherein a potentiometer is connected to a plus terminal of said summing amplifier.

3. A compensating circuit for a cold junction of a thermocouple according to claim 1, wherein said thermoelectromotive force is amplified by a chopper amplifier.

4. A compensating circuit for a cold junction of a thermocouple according to claim 1, wherein said thermoelectromotive force is amplified by a resistor arranged in a feedback line of said summing amplifier, another resistor connected between said thermocouple and the minus terminal of said summing amplifier.

5. A compensating circuit for a cold junction of a thermocouple according to claim 1, wherein said heat-sensing resistor is a copper resistor.

* * * * *

UNITED STATES PATENT AND TRADEMARK OFFICE
CERTIFICATE OF CORRECTION

PATENT NO. : 3,956,686
DATED : May 11, 1976
INVENTOR(S) : Katsuaki Tanaka

It is certified that error appears in the above-identified patent and that said Letters Patent are hereby corrected as shown below:

Column 2, line 15, "$V_{of}$" should read --$V_{of1}$--;

line 19, in the equation, "$V_{of}$" should read --$V_{of1}...(1)$--;

line 35, "$V_{of}$" should read --$V_{of2}$--;

Column 2, first line of equation 4,

"$\frac{R_5}{R_2} E_c - \frac{R_5}{R_3} \cdot \frac{R_{to}}{R_1} \alpha(E + V_{of1})t$" should read --$\{\frac{R_5}{R_2} E_c - \frac{R_5}{R_3} \cdot \frac{R_{to}}{R_1} \alpha(E+V_{of_1})t\}$--.

Signed and Sealed this

Twentieth Day of September 1977

[SEAL]

Attest:

RUTH C. MASON
Attesting Officer

LUTRELLE F. PARKER
Acting Commissioner of Patents and Trademarks